US012651574B2

(12) United States Patent
Chae et al.

(10) Patent No.: US 12,651,574 B2
(45) Date of Patent: Jun. 9, 2026

(54) DISPLAY DEVICE AND METHOD OF DRIVING SAME

(71) Applicant: LG Display Co., Ltd., Seoul (KR)

(72) Inventors: Hee Young Chae, Paju-si (KR); Kil Hwan Oh, Paju-si (KR); Sung Wook Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 210 days.

(21) Appl. No.: 18/514,731

(22) Filed: Nov. 20, 2023

(65) Prior Publication Data

US 2024/0257759 A1 Aug. 1, 2024

(30) Foreign Application Priority Data

Jan. 27, 2023 (KR) ........................ 10-2023-0011194

(51) Int. Cl.
*G09G 3/3258* (2016.01)

(52) U.S. Cl.
CPC ... *G09G 3/3258* (2013.01); *G09G 2300/0426* (2013.01); *G09G 2300/0852* (2013.01); *G09G 2320/043* (2013.01)

(58) Field of Classification Search
CPC ......... G09G 3/3258; G09G 2300/0426; G09G 2300/0852; G09G 2320/043; G09G 3/3233; G09G 3/3225; G09G 3/3275; G09G 2320/041; G09G 2300/0413; G09G 2300/0439; H10K 59/121
See application file for complete search history.

(56) References Cited

U.S. PATENT DOCUMENTS

| | | | | |
|---|---|---|---|---|
| 2015/0187273 A1* | 7/2015 | Chang | G09G 3/3233 | |
| | | | 345/77 | |
| 2022/0406252 A1* | 12/2022 | Feng | G09G 3/3233 | |
| 2023/0215383 A1* | 7/2023 | Lim | G09G 3/3233 | |

* cited by examiner

*Primary Examiner* — Temesghen Ghebretinsae
*Assistant Examiner* — Sosina Abebe
(74) *Attorney, Agent, or Firm* — Fenwick & West LLP

(57) ABSTRACT

The present disclosure provides a light emitting display device including a display panel configured to display an image, a data driver configured to drive the display panel, and a timing controller configured to control the data driver, wherein the display panel includes a first sub-pixel connected to a data line but not a sensing line, and a second sub-pixel connected to the data line and the sensing line.

20 Claims, 24 Drawing Sheets

DISPLAY DEVICE AND METHOD OF DRIVING SAME

CROSS-REFERENCE TO RELATED APPLICATION

This application claims the benefit of Republic of Korea Patent Application No. 10-2023-0011194, filed on Jan. 27, 2023, which is hereby incorporated by reference in its entirety.

BACKGROUND

Field

The present disclosure relates to a display device and a method of driving the same.

Discussion of the Related Art

As information technology develops, the market for display devices, which are communication media between users and information, is growing. Accordingly, display devices such as a light emitting display (LED) device, a quantum dot display (QDD) device, and a liquid crystal display (LCD) device are increasingly used.

The display devices described above include a display panel including sub-pixels, a driver outputting driving signals for driving the display panel, and a power supply for generating power to be supplied to the display panel or the driver.

In such display devices, when driving signals, for example, a scan signal and a data signal, are supplied to sub-pixels formed in a display panel, selected sub-pixels transmit light or directly emit, thereby displaying an image.

SUMMARY

Accordingly, the present disclosure is directed to a display device and a method of driving the same that substantially obviate one or more problems due to limitations and disadvantages of the related art.

The present disclosure compensates for deterioration of driving transistors and organic light emitting diodes included in a display panel based on heterogeneous sub-pixels including a normal sub-pixel and a compensation sub-pixel, and improves compensation performance for the entire display panel by considering driving environmental variables such as current change, voltage change, and temperature change.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a light emitting display device comprises: a display panel configured to display an image, the display panel including a data line and a sensing line; a data driver configured to drive the display panel; and a timing controller configured to control the data driver, wherein the display panel includes a first sub-pixel connected to the data line without being connected to the sensing line, and a second sub-pixel connected to the sensing line and to the data line that is connected to the first sub-pixel.

In one embodiment, a method of driving a light emitting display device including a display panel including a data line, a sensing line, a first sub-pixel connected to the data line but not the sensing line, and a second sub-pixel connected to the data line and the sensing line, the method comprising: obtaining a sensed value of the second sub-pixel through the sensing line connected to the second sub-pixel; and compensating at least one of the first sub-pixel included in the display panel and a device that is required to drive the display panel based on the sensed value of the second sub-pixel.

In one embodiment, a light emitting display device comprises: a display panel configured to display an image, the display panel including a data line, a sensing line, a first sub-pixel connected to the data line without being connected to the sensing line, and a second sub-pixel connected to the data line and the sensing line; a data driver configured to drive the display panel; and a timing controller configured to generate a compensation value corresponding to the first sub-pixel based on a sensed value of the second sub-pixel sensed through the sensing line, wherein the data driver outputs a data voltage that is compensated with the compensation value to the first sub-pixel via the data line.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

A display device according to the present disclosure may be implemented as a television system, an image player, a personal computer (PC), a home theater, an automobile electric device, a smartphone, or the like, but is not limited thereto. The display device according to the present disclosure may be implemented as a light emitting display (LED) device, a quantum dot display (QDD) device, a liquid crystal display (LCD) device, or the like. However, for convenience of description, a light emitting display device that directly emits light based on inorganic light emitting diodes or organic light emitting diodes will be described below.

In addition, a thin film transistor which will be described below may be implemented as an n-type thin film transistor, a p-type thin film transistor, or a combination of n-type and p-type thin film transistors. A thin film transistor is a three-electrode device including a gate, a source, and a drain. The source is an electrode that supplies carriers to the transistor. In a thin film transistor, carriers start flowing from the source. The drain is an electrode through which carriers exit the thin film transistor. That is, carriers flow from the source to the drain in the thin film transistor.

In the case of a p-type thin film transistor, holes are carriers, and thus a source voltage is higher than a drain voltage such that holes can flow from the source to the drain. In a p-type thin film transistor, since holes flow from the source to the drain, current flows from the source to the drain. In the other hand, in the case of an n-type thin film transistor, electrons are carriers, and thus a source voltage is lower than a drain voltage such that electrons can flow from the source to the drain. Since electrons flow from the source to the drain in the n-type thin film transistor, current flows from the drain to the source. However, the source and the drain of the thin film transistor may change depending on an applied voltage. Accordingly, in the following description, one of the source and the drain will be described as a first electrode, and the other will be described as a second electrode.

Figure 1:
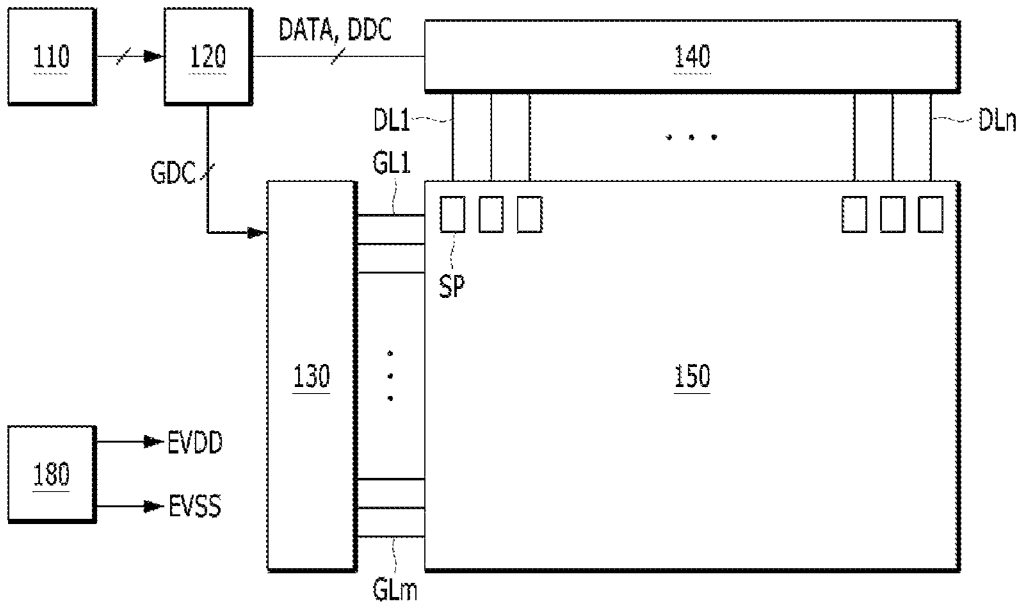
FIG. 1 is a schematic block diagram of a light emitting display device according to one embodiment.
Figure 2:
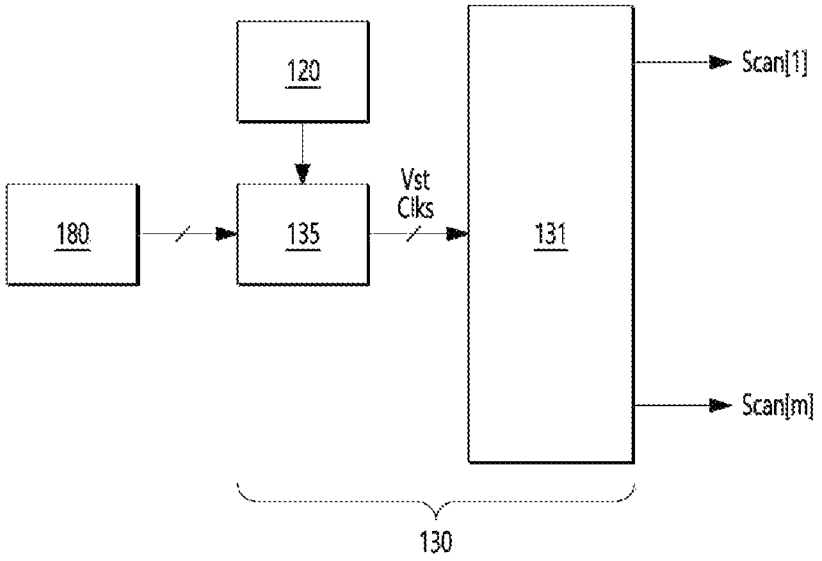
FIGS. 2 and 3 are diagrams for describing different configurations of a gate-in-panel scan driver device according to one embodiment.
Figure 3:
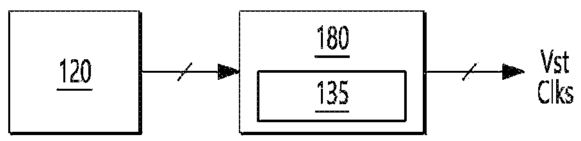
Figure 4:
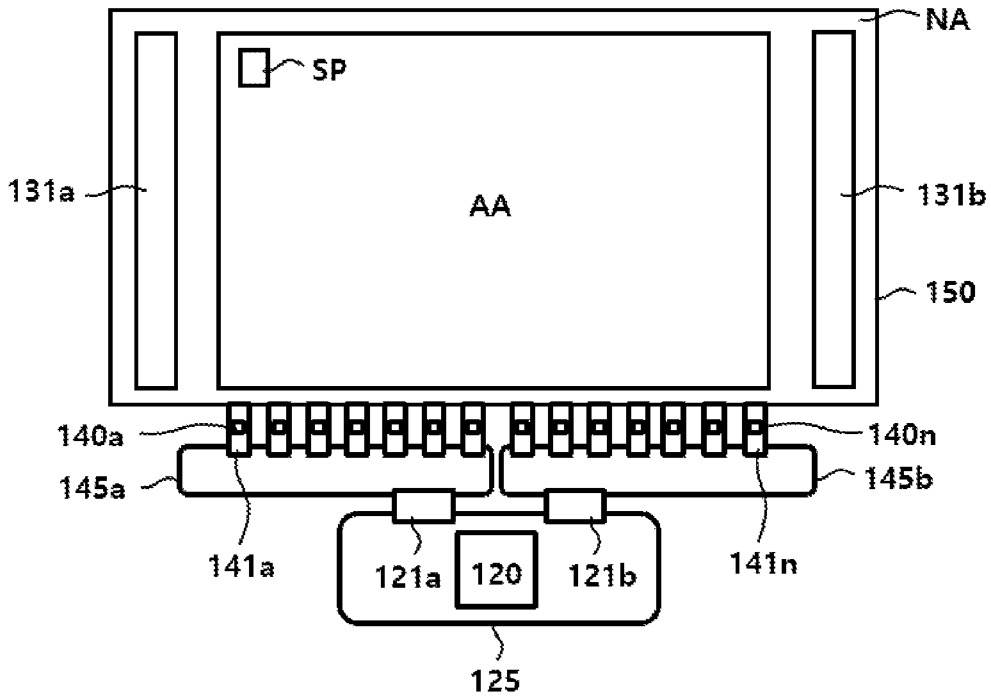
FIG. 4 is a diagram illustrating a module configuration of the light emitting display device according to one embodiment.

FIG. 1 is a schematic block diagram of a light emitting display device according to one embodiment, FIGS. 2 and 3 are diagrams for describing the configuration of a gate-in-panel scan driver according to one embodiment, and FIG. 4 is a module configuration diagram of the light emitting display device according to one embodiment.

As illustrated in FIG. 1, the light emitting display device may include an image provider 110, a timing controller 120, a scan driver 130, a data driver 140, a display panel 150, a power supply 180, and the like.

The image provider 110 (a set or a host system) may output various driving signals together with an externally supplied image data signal or an image data signal stored in an internal memory. The image provider 110 may supply data signals and various driving signals to the timing controller 120.

The timing controller 120 may output a gate timing control signal GDC for controlling the operation timing of the scan driver 130, a data timing control signal DDC for controlling the operation timing of the data driver 140, and various synchronization signals (a vertical synchronization signal Vsync, a horizontal synchronization signal Hsync, and the like). The timing controller 120 may supply a data signal DATA supplied from the image provider 110 to the data driver 140 together with the data timing control signal DDC. The timing controller 120 may be implemented in the form of an integrated circuit (IC) and mounted on a printed circuit board, but is not limited thereto.

The scan driver 130 may output a scan signal in response to the gate timing control signal GDC supplied from the timing controller 120. The scan driver 130 may supply scan signals to sub-pixels SP included in the display panel 150 through gate lines GL1 to GLm. The scan driver 130 may be implemented in the form of an IC or directly formed on the display panel 150 in a gate-in-panel structure, but is not limited thereto.

The data driver 140 may sample and latch the data signal DATA in response to the data timing control signal DDC supplied from the timing controller 120, convert the digital data signal into an analog data voltage on the basis of a gamma reference voltage, and output the analog data voltage. The data driver 140 may supply data voltages to the sub-pixels SP included in the display panel 150 through data lines DL1 to DLn. The data driver 140 may be implemented in the form of an integrated circuit (IC) and mounted on the display panel 150 or mounted on a printed circuit board, but is not limited thereto.

The power supply 180 may generate a first driving voltage at a high level and a second driving voltage at a low level based on an external input voltage supplied from the outside, and output the same through a first driving voltage line EVDD and a second driving voltage line EVSS. The power supply 180 may generate and output voltages (e.g., a gate high voltage and a gate low voltage) necessary to drive the scan driver 130 and voltages (e.g., a drain voltage and a half drain voltage) necessary to drive the data driver 140 as well as the first driving voltage and the second driving voltage.

The display panel 150 may display an image in response to driving signals including a scan signal and a data voltage, the first driving voltage, and the second driving voltage. The sub-pixels of the display panel 150 may directly emit light. The display panel 150 may be manufactured based on a substrate having rigidity or flexibility, such as glass, silicon, polyimide, or the like. In addition, the sub-pixels that emit light may include red, green, and blue pixels or include red, green, blue, and white pixels.

Meanwhile, in the above description, the timing controller 120, the scan driver 130, the data driver 140, and the like are described as individual components. However, depending on the implementation method of the light emitting display device, one or more of the timing controller 120, the scan driver 130, and the data driver 140 may be integrated into one IC.

As illustrated in FIGS. 2 and 3, the gate-in-panel type scan driver may include a shift register 131 and a level shifter 135. The level shifter 135 may generate scan clock signals Clks and a start signal Vst based on signals and voltages output from the timing controller 120 and the power supply 180.

The shift register 131 operates based on the signals Clks and Vst output from the level shifter 135 and may output scan signals Scan[1] to Scan[m] for turning on or off transistors formed in the display panel. The shift register 131 may be formed as a thin film on the display panel in a gate-in-panel structure.

Unlike the shift register 131, the level shifter 135 may be independently configured as an integrated circuit (IC) or may be included in the power supply 180. However, this is merely an example and the present disclosure is not limited thereto.

As illustrated in FIG. 4, the display panel 150 may include a display area AA in which an image is displayed and a non-display area NA in which an image is not displayed. Sub-pixels SP may be positioned in the display area AA. Shift registers 131*a* and 131*b* outputting scan signals from a gate-in-panel scan driver may be positioned in the non-display area NA.

The display panel 150 may be configured as a module including a plurality of data drivers 140*a* to 140*n* mounted on a plurality of first circuit boards 141*a* to 141*n* and a single timing controller 120 mounted on a control board 125. The plurality of data drivers 140*a* to 140*n* and the single timing controller 120 may be electrically connected by at least two second circuit boards 145*a* to 145*b* and at least two cables 121*a* and 121*b*. The plurality of first circuit boards 141*a* to 141*n* may be flexible circuit boards, and the at least two second circuit boards 145*a* to 145*b* may be printed circuit boards. However, the module configuration shown in FIG. 4 is only for easy understanding, and the present disclosure is not limited thereto.

Figure 5:
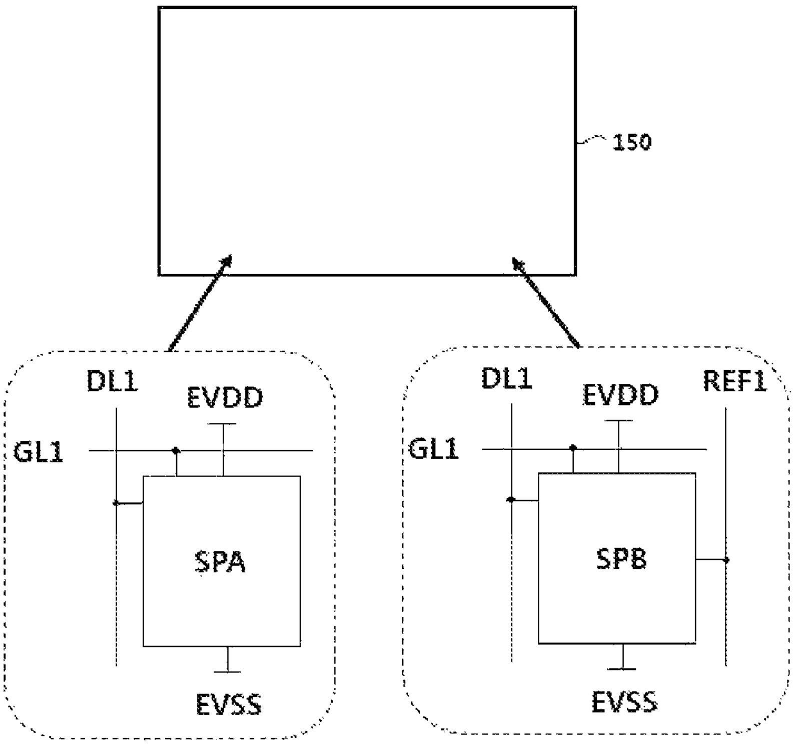
FIG. 5 is a diagram illustrating a sub-pixel configuration of a display panel according to a first embodiment of the present disclosure.
Figure 6:
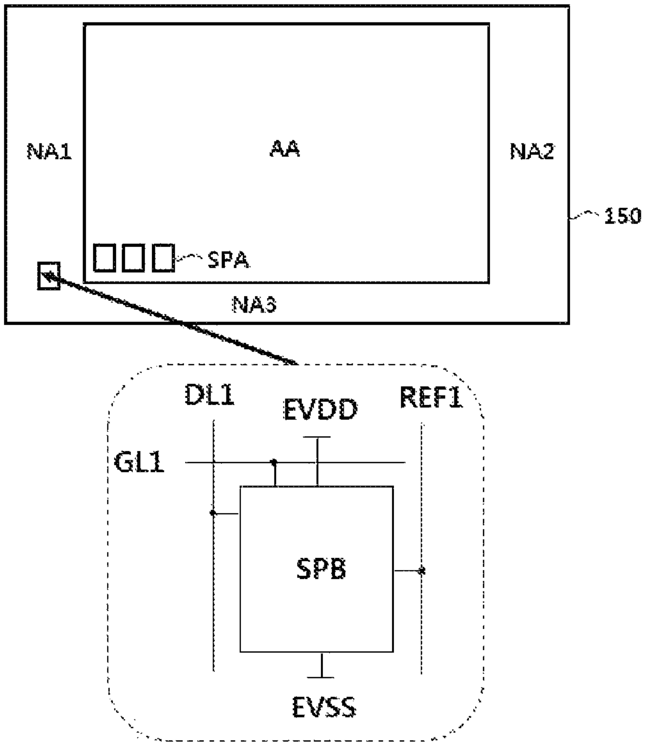
FIGS. 6 and 7 are diagrams illustrating a first arrangement example of compensation sub-pixels according to one embodiment.
Figure 7:
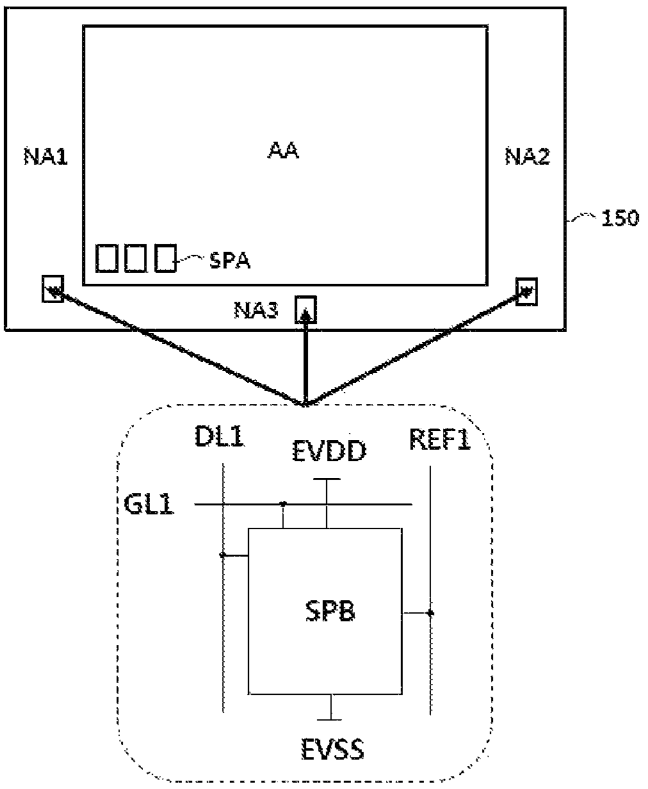
Figure 8:
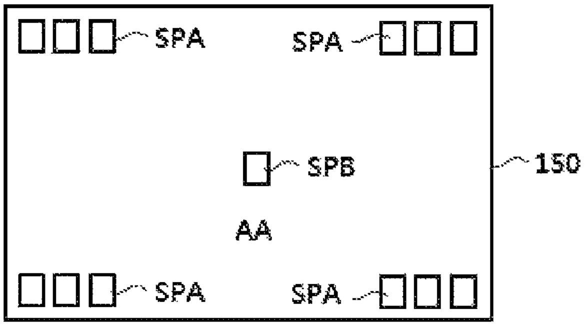
FIGS. 8, 9, and 10 are diagrams illustrating a second arrangement example of compensation sub-pixels according to one embodiment.
Figure 9:
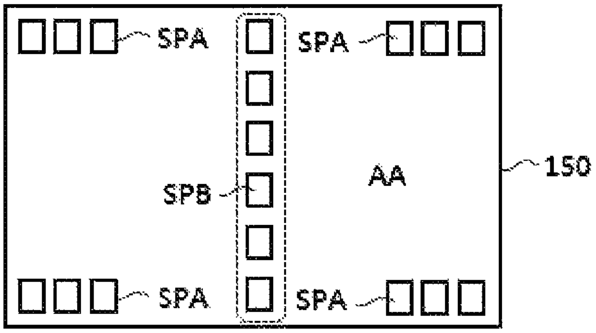
Figure 10:
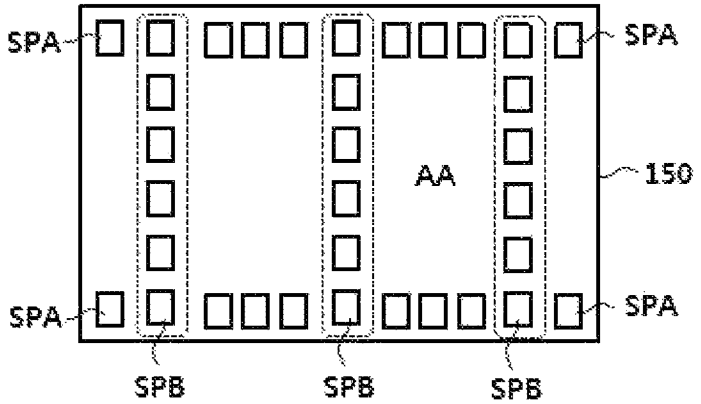
Figure 11:
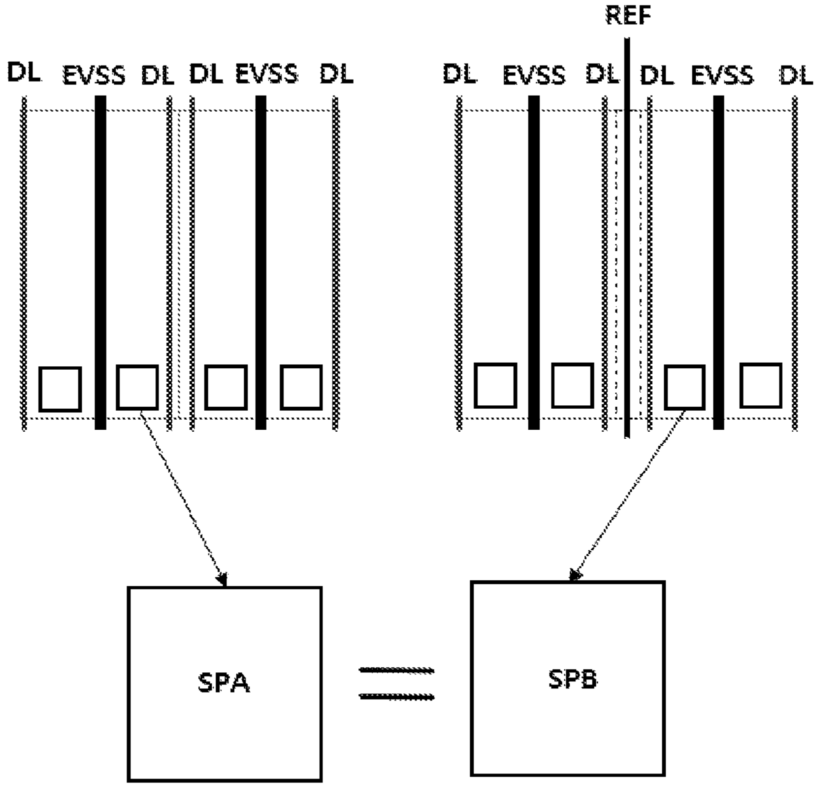
FIG. 11 is a diagram illustrating an aperture ratio relationship between a normal sub-pixel and a compensation sub-pixel according to the second arrangement example according to one embodiment.
Figure 12:
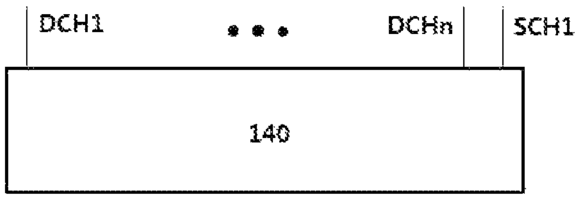
FIG. 12 is a diagram illustrating an output channel arrangement of a data driver according to mixed use of normal sub-pixels and compensation sub-pixels according to one embodiment.

FIG. 5 is a diagram illustrating a sub-pixel configuration of a display panel according to a first embodiment of the present disclosure, FIGS. 6 and 7 are diagrams illustrating a first arrangement example of compensation sub-pixels according to one embodiment, FIGS. 8 to 10 are diagrams illustrating a second arrangement example of compensation sub-pixels according to one embodiment, FIG. 11 is a diagram illustrating an aperture ratio relationship between a normal sub-pixel and a compensation sub-pixel according to the second arrangement example according to one embodiment, and FIG. 12 is a diagram illustrating an output channel arrangement of a data driver according to mixed use of normal sub-pixels and compensation sub-pixels according to one embodiment.

As illustrated in FIG. 5, according to the first embodiment of the present disclosure, the display panel 150 may include a normal sub-pixel SPA (first sub-pixel) and a compensation sub-pixel SPB (second sub-pixel). The normal sub-pixel SPA may be connected to a first gate line GL1, a first data line DL1, a first driving voltage line EVDD, and a second driving voltage line EVSS. In contrast, the compensation sub-pixel SPB may be connected to the first gate line GL1, the first data line DL1, a first sensing line REF1, the first driving voltage line EVDD, and the second driving voltage line EVSS. Thus, the first sensing line REF1 is connected to the compensation sub-pixel SPB, but not to the normal sub-pixel SPA. The first sensing line REF1 may be used to detect electrical characteristics of the element(s) included in the compensation sub-pixel SPB, which will be described below.

As illustrated in FIG. 6, the compensation sub-pixel SPB may be disposed in a first non-display area NA1 (or a left non-display area) in one embodiment. However, the compensation sub-pixel SPB may be disposed in a second non-display area NA2 (or a right non-display area), or a third non-display area NA3 (or a lower non-display area) of the display panel 150. Here, the third non-display area NA3 may correspond to an area to which a circuit board on which the data driver is mounted is attached. One or more compensation sub-pixels SPB may be disposed in a selected area.

As illustrated in FIG. 7, compensation sub-pixels SPB may be disposed in the first non-display area NA1 (or left non-display area), the second non-display area NA2 (or right non-display area), and the third non-display area NA3 (or the lower non-display area) of the display panel 150. One or more compensation sub-pixels SPB may be disposed in the selected area.

As illustrated in FIGS. 8 to 10, the compensation sub-pixel SPB and the normal sub-pixel SPA may be disposed together in the display area AA of the display panel 150. Only one compensation sub-pixel SPB may be disposed in the center of the display area AA of the display panel 150 as shown in FIG. 8, or compensation sub-pixels SPB may be disposed in one line in a vertical direction as shown in FIG. 9 or may be disposed in a plurality of lines in the vertical direction as shown in FIG. 10.

Although not shown, the compensation sub-pixels SPB may also be disposed in the non-display area as illustrated in FIG. 6 or FIG. 7. Further, although not shown, the compensation sub-pixel SPB may be disposed outside the display area AA or in a dummy area defined in the display panel 150. In one embodiment, the compensation sub-pixels SPB may be disposed in a distributed within the display area AA at a plurality of different positions in the display area AA.

As illustrated in FIG. 11, the normal sub-pixel SPA and the compensation sub-pixel SPB may be disposed such that they have an opening area (or light emitting area) of the same size. The compensation sub-pixel SPB is connected to the first sensing line REF1 differently from the normal sub-pixel SPA. The compensation sub-pixel SPB may further include at least one transistor for operation required for sensing differently from the normal sub-pixel SPA.

As such, since the compensation sub-pixel SPB further includes at least one transistor in addition to the first sensing line REF1, relative luminance decrease or lifespan decrease may occur if the compensation sub-pixel SPB is disposed to occupy a plurality of lines as illustrated in FIG. 9 or FIG. 10. Therefore, if the normal sub-pixel SPA and the compensation sub-pixel SPB are disposed such that they have an aperture area (or light emitting area) of the same size as shown in FIG. 11, a luminance decrease or lifespan decrease problem can be solved. Meanwhile, when the normal sub-pixel SPA and the compensation sub-pixel SPB are applied, a deviation compensation method using an analog-to-digital conversion circuit (ADC) may be used to solve the luminance decrease problem, but the present disclosure is not limited thereto.

As illustrated in FIG. 12, the data driver 140 may include a plurality of output channels DCH1 to DCHn for outputting data voltages and at least one sensing channel SCH1 for obtaining a sensed value. The first output channel DCH1 to the Nth output channel DCHn may be connected to data lines of the normal sub-pixels SPA and the compensation sub-pixels SPB shown in FIGS. 8 to 10. The first sensing channel SCH1 may be connected to the first sensing line REF1 of the compensation sub-pixels SPB shown in FIGS. 8 to 10.

Accordingly, the compensation sub-pixels SPB may be connected to the Nth output channel DCHn located at the end of the data driver 140 and the first sensing channel SCH1, but is not limited thereto. Meanwhile, in FIG. 10, it can be ascertained that channels are disposed such that the compensation sub-pixels SPB are connected to the end portion of the data driver 140.

Figure 13:
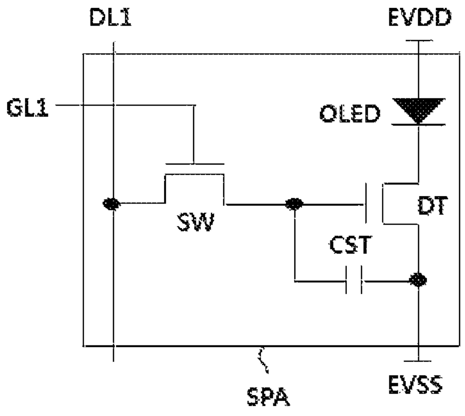
FIG. 13 is a diagram illustrating a circuit configuration of a normal sub-pixel according to one embodiment.
Figure 14:
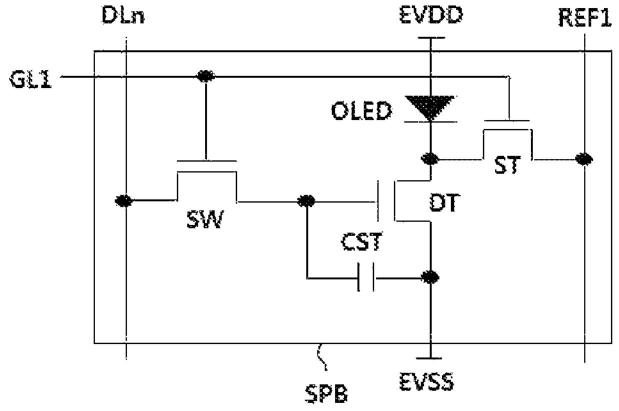
FIG. 14 is a diagram illustrating a circuit configuration of a compensation sub-pixel according to one embodiment.
Figure 15:
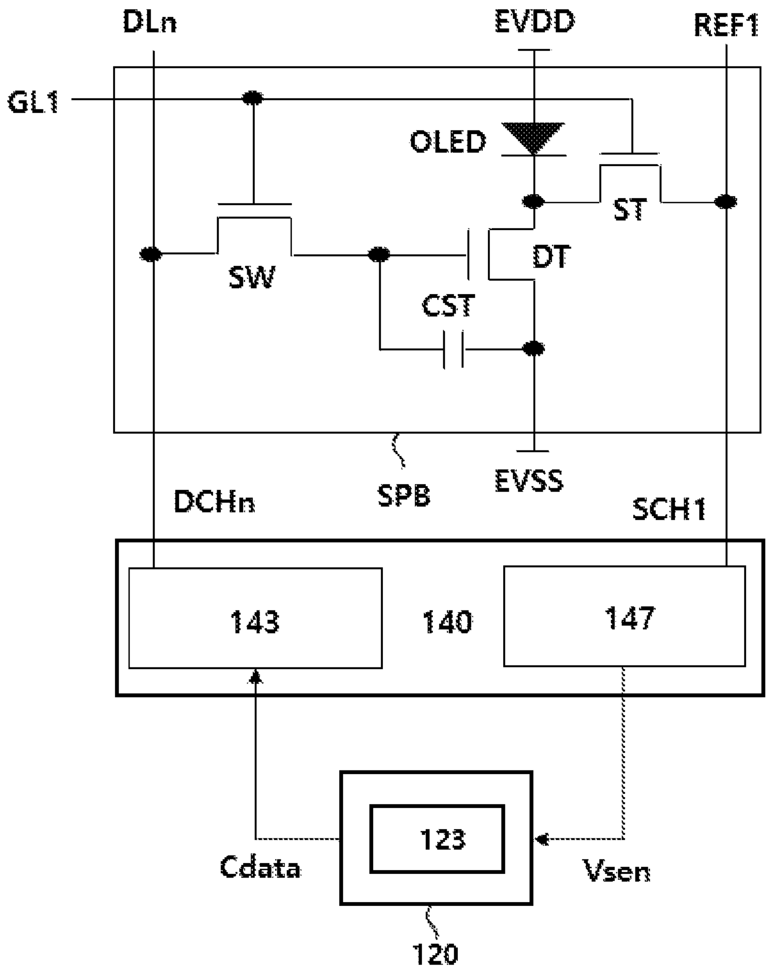
FIG. 15 is a diagram for briefly describing the configuration of a data driver connected to a compensation sub-pixel according to one embodiment.
Figure 16:
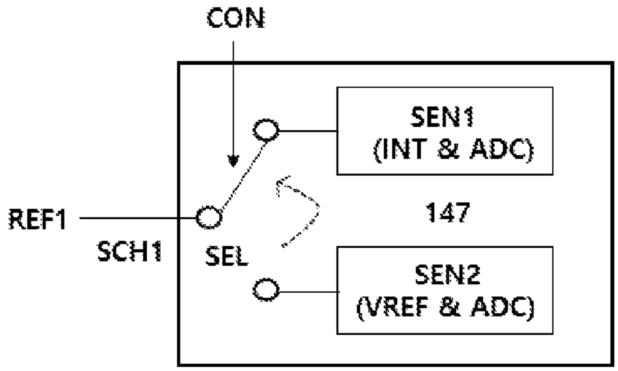
FIG. 16 is a diagram for briefly describing the configuration of a sensing unit included in the data driver according to one embodiment.
Figure 17:
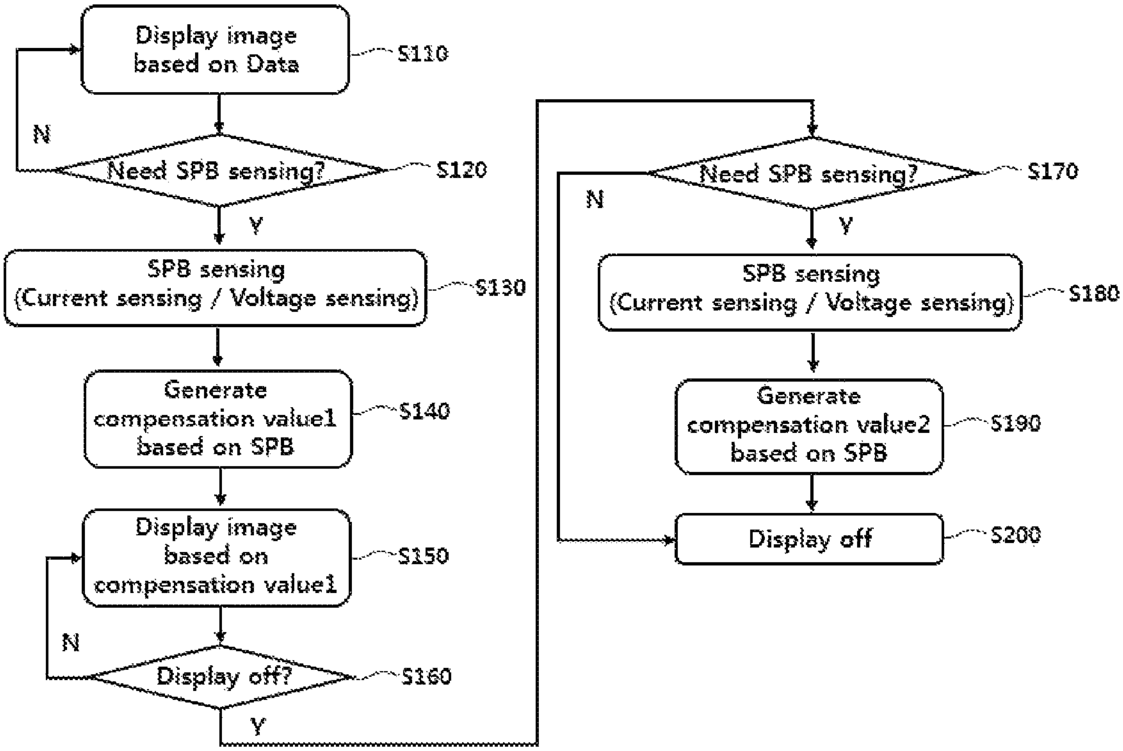
FIG. 17 is a flowchart illustrating a compensation method according to the first embodiment of the present disclosure.

FIG. 13 is a diagram illustrating a circuit configuration of the normal sub-pixel according to one embodiment, FIG. 14 is a diagram illustrating a circuit configuration of the compensation sub-pixel according to one embodiment, FIG. 15 is a diagram for briefly describing the configuration of a data driver connected to the compensation sub-pixel according to one embodiment, FIG. 16 is a diagram for briefly describing the configuration of a sensing unit included in the data driver according to one embodiment, and FIG. 17 is a flowchart illustrating a compensation method according to the first embodiment of the present disclosure.

As illustrated in FIG. 13, the normal sub-pixel SPA may include a switching transistor SW, a capacitor CST, a driving transistor DT, and an organic light emitting diode OLED.

The switching transistor SW may serve to transfer a data voltage applied through the first data line DL1 to a first electrode of the capacitor CST. The capacitor CST may serve to store a data voltage for driving the driving transistor DT. The driving transistor DT may serve to generate a driving current in response to the data voltage stored in the capacitor CST. The organic light emitting diode OLED may emit light in response to the operation (driving current) of the driving transistor DT.

The normal sub-pixel SPA may use a sensing-less compensation method to predict and compensate for a degree of deterioration based on a data counting method or a modeling method provided based on usage time, without directly sensing a deteriorated element. However, since the sensing-less compensation method is not a method of directly sensing a deteriorated element, it may be difficult to achieve precise compensation using the sensing-less compensation method.

As illustrated in FIG. 14, the compensation sub-pixel SPB may include a switching transistor SW, a capacitor CST, a driving transistor DT, a sensing transistor ST, and an organic light emitting diode OLED.

An anode of the organic light emitting diode OLED may be connected to the first driving voltage line EVDD and a cathode may be connected to a first electrode of the driving transistor DT. The driving transistor DT has a gate electrode connected to a first electrode of the capacitor CST, the first electrode connected to the cathode of the organic light emitting diode OLED, and a second electrode connected to the second driving voltage line EVSS. The first electrode of the capacitor CST may be connected to the gate electrode of the driving transistor DT, and a second electrode thereof may be connected to the second electrode of the driving transistor DT and the second driving voltage line EVSS.

The switching transistor SW may have a gate electrode connected to the first gate line GL1, a first electrode connected to the Nth data line DLn, and a second electrode connected to the gate electrode of the driving transistor DT. The sensing transistor ST may have a gate electrode connected to the first gate line GL1, a first electrode connected to the first sensing line REF1, and a second electrode connected to the cathode of the organic light emitting diode OLED that is a sensing node and the first electrode of the driving transistor DT.

The compensation sub-pixel SPB may use a sensing type compensation method for determining and compensating for a degree of deterioration based on an internal circuit and an external circuit capable of directly sensing a deteriorated element. The sensing-type compensation method is a method capable of directly sensing a deteriorated element, and thus has an advantage of enabling precise compensation.

Meanwhile, the sensing transistor ST is a transistor that is turned on during a sensing operation, and may be modified such that it is connected to the second electrode of the driving transistor DT instead of being connected between the cathode of the organic light emitting diode OLED and the first electrode of the driving transistor DT, which will be described below.

As illustrated in FIG. 15, the data driver 140 may include a voltage output circuit 143 that outputs data voltages and a pixel sensing circuit 147 that obtains sensed values. The Nth output channel DCHn of the voltage output circuit 143 may be connected to the Nth data line DLn of the compensation sub-pixel SPB, and the first sensing channel SCH1 of the pixel sensing circuit 147 may be connected to the first sensing line REF1 of the compensation sub-pixel SPB.

The pixel sensing circuit 147 may be used to sense whether or not the driving transistor DT and the organic light emitting diode OLED are deteriorated. Further, the pixel sensing circuit 147 may be used to sense whether or not the driving transistor DT and the organic light emitting diode OLED are abnormal. In addition, the pixel sensing circuit 147 may be used to sense current flowing through the driving transistor DT and the organic light emitting diode OLED or a voltage thereof.

The data driver 140 may convert a sensed value Vsen obtained by the pixel sensing circuit 147 into a digital value and transmit the converted digital value to the timing controller 120 (or compensation circuit). Further, the timing controller 120 may determine whether the characteristics of the element(s) included in the compensation sub-pixel SPB have changed based on the sensed value Vsen converted into a digital value, and provide a compensation value for compensating for normal sub-pixels (including the compensation sub-pixels) depending on a degree of change in the characteristics.

The timing controller 120 may use the compensation value for a deterioration prediction compensator 123 (e.g., a circuit) in order to compensate for the normal sub-pixels in a non-sensing manner, and provide a compensation data signal Cdata based on the compensation value. In this case, the deterioration prediction compensator 123 re-establishes and updates a previously provided deterioration prediction model in response to change in the characteristics of actually deteriorated elements based on the sensed value Vsen, and thus accuracy in prediction of deterioration and compensation performance can be improved. However, the timing controller 120 may provide the compensation data signal Cdata for compensating for the normal sub-pixels based on the compensation value without the deterioration prediction compensator 123. Meanwhile, the timing controller 120 may obtain driving environmental variables such as current change, voltage change, and temperature change (a method of predicting temperature change based on current or voltage change) based on the sensed value Vsen that is indicative of the driving environmental variables and may individually or collectively compensate for (control) the display panel (e.g., normal sub-pixels) and devices necessary for driving the display panel (e.g., the data driver, scan driver, power supply, and the like) based on the driving environmental variables.

As illustrated in FIG. 16, the pixel sensing circuit 147 may include a selection circuit SEL, a first sensing circuit SEN1, and a second sensing circuit SEN2 to sense compensation sub-pixels in a selective manner according to driving timing and purpose.

The selection circuit SEL is a circuit for selecting a method of sensing a compensation sub-pixel. The selection circuit SEL may include a first electrode connected to the first sensing channel SCH1, a second electrode connected to a sensing terminal of the first sensing circuit SEN1, and a third electrode connected to a sensing terminal of the second sensing circuit SEN2. The selection circuit SEL may connect the first sensing channel SCH1 to the first sensing circuit SEN1 or to the second sensing circuit SEN2 in response to a control signal CON. In one embodiment, the timing controller controls the selection circuit SEL to switch between the first sensing circuit SEN1 and the second sensing circuit SEN2. For example, the first control signal CON may have a first level that selects the first sensing circuit SEN1 or may have a second level that selects the second sensing circuit SEN2.

The first sensing circuit SEN1 may be configured to sense compensation sub-pixels using a first sensing method (current sensing method). The first sensing circuit SEN1 may include an integrator and an analog-to-digital conversion circuit (INT & ADC) to cumulatively sense current from a plurality of compensation sub-pixels, convert the same into a digital form, and output the same as a sensed value. The second sensing circuit SEN2 is a circuit configured to sense a plurality of compensation sub-pixels using a second sensing method (voltage sensing method) that is different from the first sensing method. The second sensing circuit SEN2 may include a reference voltage source and an analog-to-digital conversion circuit (VREF & ADC) to apply a reference voltage to a compensation sub-pixel, sense a voltage therefrom, convert the voltage into a digital form, and output the same as a sensed value.

As illustrated in FIG. 17, the light emitting display device according to the first embodiment of the present disclosure can operate based on the flow which will be described below, but it should be noted that the flow is an example.

When power is applied to the light emitting display device and preparation necessary for operation of the device is completed, an image may be displayed on the display panel based on a data voltage Data (S110). The light emitting display device may inquire as to whether sensing is required for the compensation sub-pixel at predetermined intervals or set intervals (S120). If sensing of the compensation sub-pixel is not required (N), an image may be displayed based on the data voltage Data (S110).

On the other hand, if sensing of the compensation sub-pixel is required (Y), the compensation sub-pixel can be sensed according to the first sensing method (current sensing) or the second sensing method (voltage sensing) (S130). When sensing of the compensation sub-pixel is completed, the light emitting display device generates a first compensation value based on a first sensed value of the compensation sub-pixel (e.g., a mobility sensed value of the driving transistor) (S140). When the first compensation value is generated based on the first sensed value of the compensation sub-pixel, the light emitting display device may display an image on the display panel based on the first compensation value (S150).

If the power applied to the display panel is cut off (Y) (S160), the light emitting display device may re-inquire as to whether or not sensing of the compensation sub-pixel is required (S170). If sensing of the compensation sub-pixel is not required (N), the display panel may be powered off (S200).

On the other hand, if sensing of the compensation sub-pixel is required (Y), the compensation sub-pixel can be sensed through the first sensing method (current sensing) or the second sensing method (voltage sensing) (S180). When sensing of the compensation sub-pixel is completed, the light emitting display device may generate a second compensation value based on a second sensed value of the compensation sub-pixel (e.g., a threshold voltage sensed value of the driving transistor) (S190). When the second compensation value is generated based on the second sensed value of the compensation sub-pixel, the light emitting display device may store the second compensation value in a memory and then turn off the display panel (S200).

Figure 18:
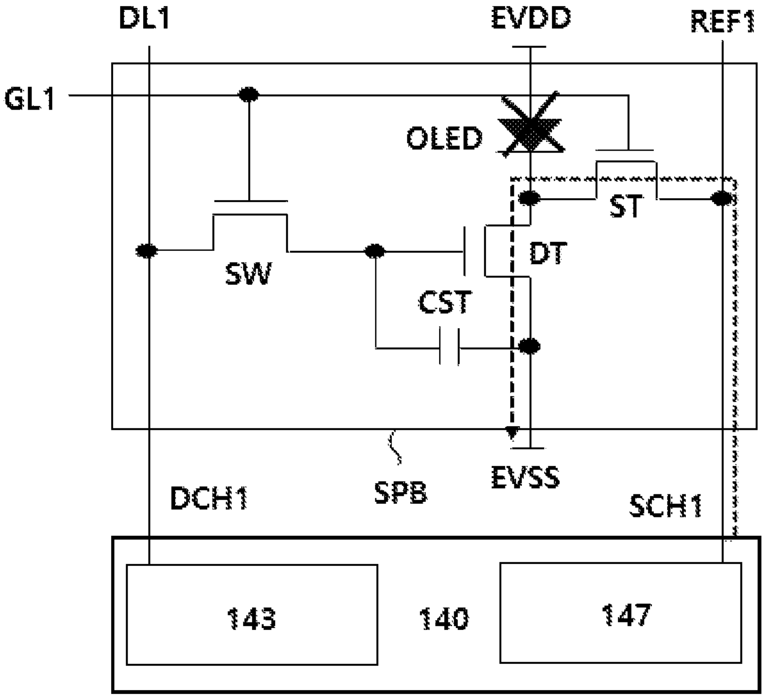
FIGS. 18 and 19 are diagrams schematically illustrating a first sensing method according to a second embodiment of the present disclosure.
Figure 19:
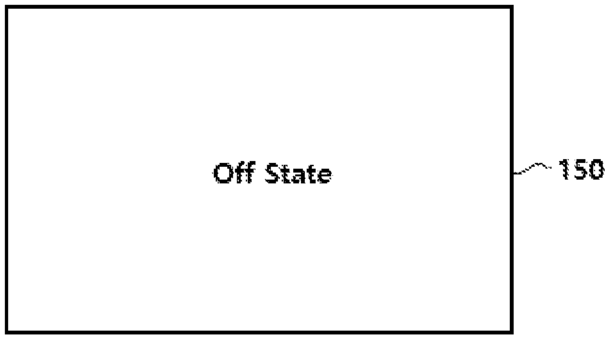

FIGS. 18 and 19 are diagrams schematically illustrating a first sensing method according to a second embodiment of the present disclosure.

As illustrated in FIGS. 18 and 19, the first sensing method according to the second embodiment of the present disclosure can be performed in an off state in which the screen of the display panel 150 is turned off. The case where the screen of the display panel 150 is turned off may mean a non-light emitting state in which light is not emitted from the organic light emitting diode OLED although the operation of the device can be performed.

Figure 20:
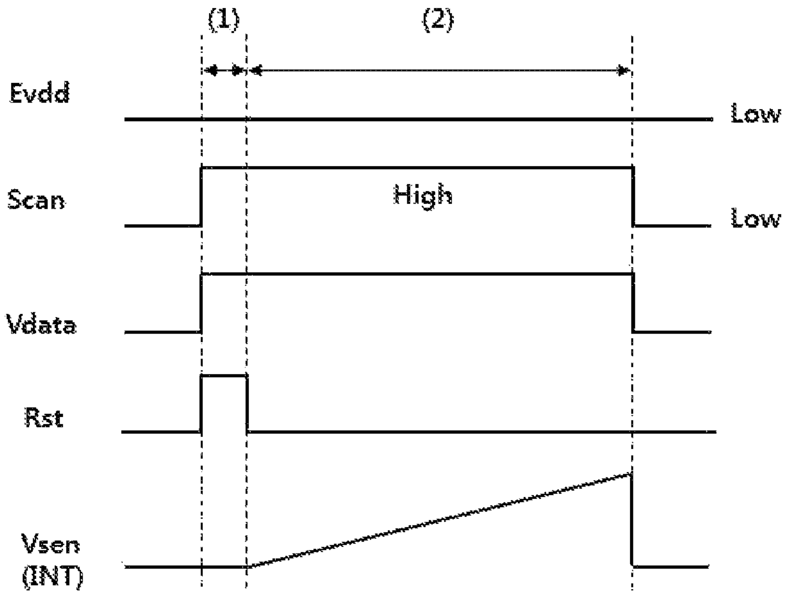
FIGS. 20, 21, and 22 are diagrams for describing the first sensing method according to the second embodiment of the present disclosure in more detail.
Figure 21:
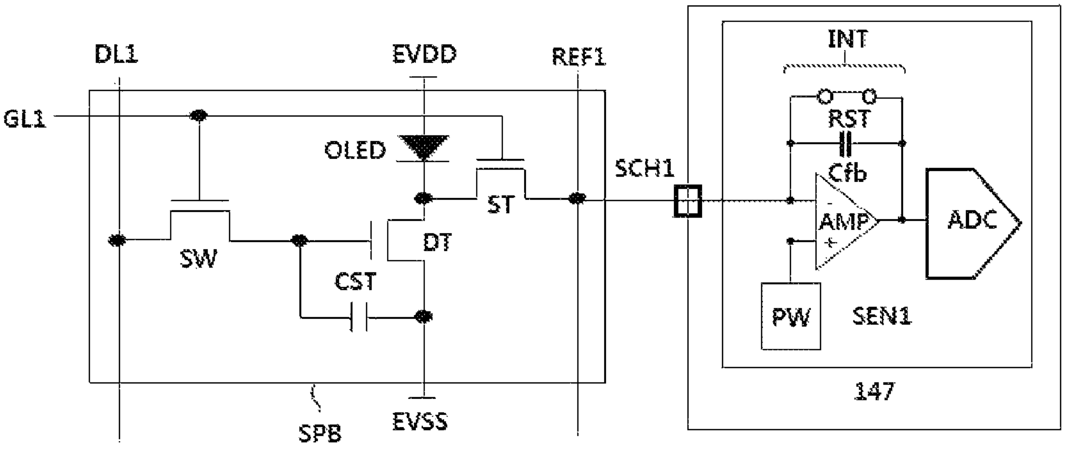
Figure 22:
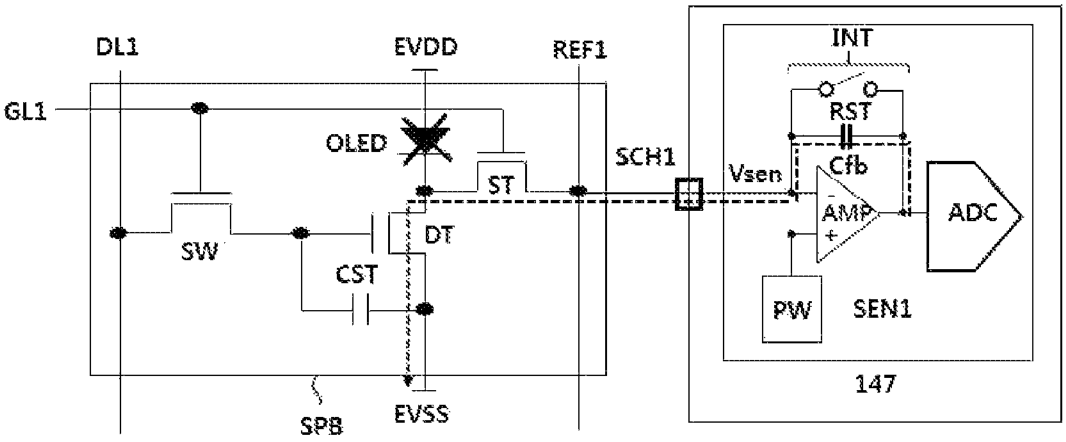

FIGS. 20 to 22 are diagrams for describing the first sensing method according to the second embodiment of the present disclosure in more detail.

As illustrated in FIGS. 20 to 22, in order to perform the first sensing method according to the second embodiment of the present disclosure, the pixel sensing circuit 147 may sense the compensation sub-pixel SPB, integrate sensed values and output a sensed value Vsen based on the first sensing circuit SEN1 including the integrator INT and the like.

The first sensing circuit SEN1 may include the integrator INT including a reset switch RST, a feedback capacitor Cfb, and an amplifier AMP, and the analog-to-digital conversion circuit ADC that converts the analog sensed value Vsen output from the integrator INT into a digital sensed value and outputs the same. The power PW applied to the non-inverting terminal (+) of the integrator INT may be set to a level higher than the gate-source voltage of the driving transistor DT (to enable transistors included in the sub-pixel to be driven in a saturation mode).

In order to perform the first sensing method according to the second embodiment, a first driving voltage Evdd corresponding to a low voltage state may be applied to the first driving voltage line EVDD during a first period (1) and a second period (2) (a state in which 0 V is applied or the voltage cut off). A scan signal Scan at a high voltage may be applied to the first gate line GL1 during the first period (1) and the second period (2). In addition, a sensing data voltage Vdata may be applied to the first data line DL1 for the first period (1) and the second period (2). A reset signal Rst at a high voltage may be applied to the reset switch RST during the first period (1), and the reset signal Rst at a low voltage may be applied to the reset switch RST during the second period (2).

The first period (1) may be defined as an initialization period in which the gate source voltage of the driving transistor DT and the output terminal of the integrator INT are initialized. As illustrated in FIG. 21, the reset switch RST included in the first sensing circuit SEN1 may be turned on during the first period (1) corresponding to the initialization period. Accordingly, the gate drain node of the driving transistor DT and the output terminal of the integrator INT may be initialized based on the power PW.

The second period (2) may be defined as a sensing period in which current generated through a path between the integrator INT and the second driving voltage line EVSS is sensed. As illustrated in FIG. 22, during the second period (2) corresponding to the sensing period, current may flow through a path from the integrator INT to the second driving voltage line EVSS. Accordingly, a sensed value Vsen corresponding to the current flowing through the path may be integrated in the feedback capacitor Cfb.

When the compensation sub-pixel SPB is driven in the above manner, the switching transistor SW, the driving transistor DT, and the sensing transistor ST are turned on, but the organic light emitting diode OLED is turned off (non-emission state). In this case, since the organic light emitting diode OLED is in an electrically floating state, a path between the first driving voltage line EVDD and the second driving voltage line EVSS may not be formed (disconnected). On the other hand, the driving transistor DT is turned on by the sensing data voltage Vdata and thus can generate current. Further, a path through which current can flow through the second driving voltage line EVSS may be formed between the driving transistor DT and the pixel sensing circuit 147.

The pixel sensing circuit 147 may convert the sensed value Vsen obtained through the compensation sub-pixel SPB into a digital value and transmit the converted digital value to the timing controller (or compensation circuit). The timing controller may determine whether or not the characteristics (threshold voltage or mobility) of the driving transistor DT included in the compensation sub-pixel SPB have changed based on the sensed value converted into a digital value and provide a compensation value for compensating for normal sub-pixels depending on the degree of change in the characteristics.

As described above, according to the first sensing method according to the second embodiment of the present disclosure, it is possible to sense whether or not the characteristics of the driving transistor DT included in the compensation sub-pixel SPB have changed in an off state in which the screen of the display panel 150 is turned off. In addition, it is possible to provide a compensation value for compensating for normal sub-pixels (including the compensation sub-pixels) based on whether or not the characteristics of the driving transistor DT included in the compensation sub-pixel SPB have changed. In this case, the compensation value may be used as a value capable of compensating for the gain of a data signal or the level of a data voltage.

Figure 23:
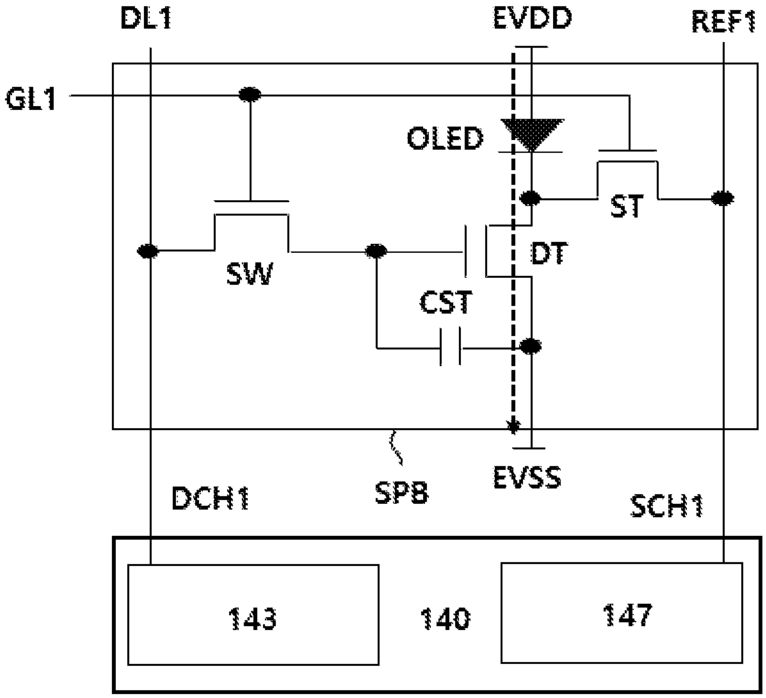
FIGS. 23, 24, and 25 are diagrams for describing a second sensing method according to a third embodiment of the present disclosure.
Figure 24:
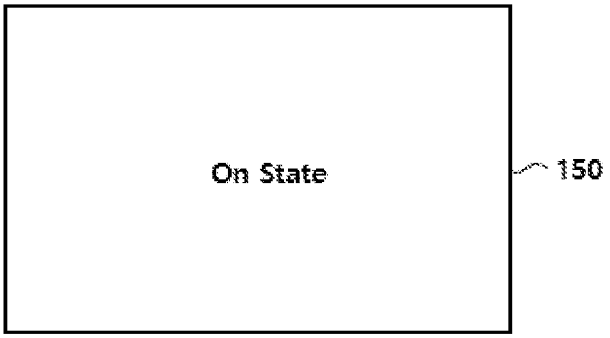
Figure 25:
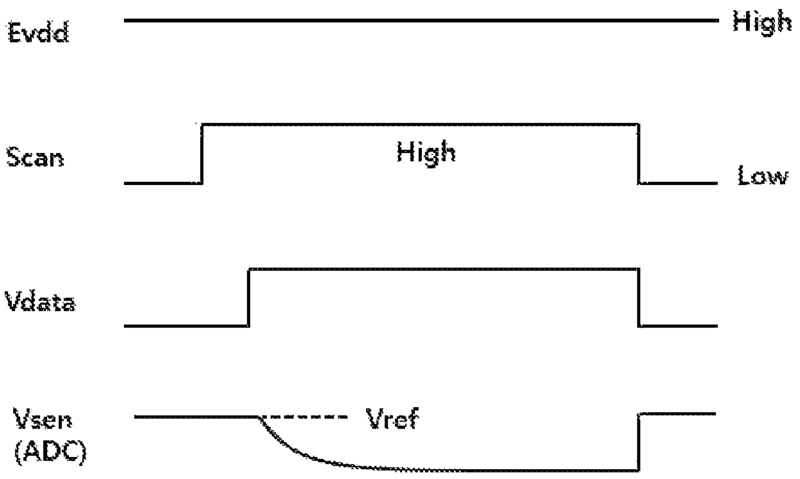

FIGS. 23 to 25 are diagrams for describing a second sensing method according to a third embodiment of the present disclosure.

As illustrated in FIGS. 23 to 25, the second sensing method according to the third embodiment of the present disclosure can be performed in an on state in which the screen of the display panel 150 is turned on. A case where the screen of the display panel 150 is turned on may mean a light emitting state in which the device operates and light is emitted from the organic light emitting diode OLED.

In order to perform the second sensing method, the first driving voltage Evdd corresponding to a high voltage may be applied to the first driving voltage line EVDD. A scan signal Scan at a high voltage may be applied to the first gate line GL1. Further, the sensing data voltage Vdata may be applied to the first data line DL1. A sensing reference voltage Vref may be applied to the first sensing line REF1.

When the compensation sub-pixel SPB is driven in the above manner, the switching transistor SW, the driving transistor DT, the sensing transistor ST, and the organic light emitting diode OLED can be turned on. In this case, a path through which current can flow from the first driving voltage line EVDD to the second driving voltage line EVSS can be formed between the organic light emitting diode OLED and the driving transistor DT. When the path is formed, the pixel sensing circuit 147 may sense change in the potential of the drain node of the driving transistor DT through the first sensing line REF1.

In operation according to the second sensing method, the pixel sensing circuit 147 may sense the compensation sub-pixel SPB in real time using the second sensing circuit SEN2 including the reference voltage source and analog-to-digital conversion circuit VREF & ADC as shown in FIG. 16 and output a sensed value Vsen. The sensed value Vsen shown in FIG. 25 is input to an input terminal of the analog-to-digital conversion circuit ADC included in the pixel sensing circuit 147.

The pixel sensing circuit 147 may convert the sensed value Vsen obtained through the compensation sub-pixel SPB into a digital value and transmit the converted digital value to the timing controller (or compensation circuit). The timing controller may determine whether or not there is voltage change (change in the drain node potential of DT) through the compensation sub-pixel SPB based on the sensed value converted into a digital value and provide a compensation value for compensating for normal sub-pixels in real time depending on the degree of voltage change.

According to the second sensing method according to the third embodiment of the present disclosure, it is possible to sense presence or absence of voltage change in real time through the compensation sub-pixel SPB in an on state in which the screen of the display panel 150 is turned on. In addition, it is possible to provide a compensation value for compensating for normal sub-pixels (including the compensation sub-pixels) in real time based on presence or absence of voltage change through the compensation sub-pixel SPB. In this case, the compensation value may be used as a value capable of compensating for the level of the first driving voltage or the second driving voltage.

Although the second sensing method according to the third embodiment of the present disclosure is performed in an on state in which the screen of the display panel 150 is turned on, the second sensing method may be performed during a blank time (non-display time) having relatively stable current change as compared to a display time (active time) in order to detect abnormal current/voltage or temperature change. Here, detection of abnormality may be included in a process for determining presence or absence of a short circuit (burn) in the display panel. In addition, detection of abnormality may be included in a process for compensating for rising of the second driving voltage EVSS for each position within the display panel. Further, detection of temperature change may be included in a process for considering differences in temperature characteristics at positions at the time of compensating for the organic light emitting diode OLED and the driving transistor DT.

Figure 26:
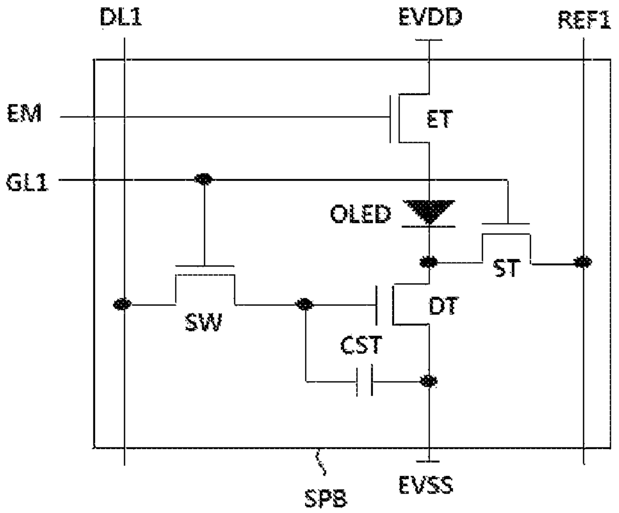
FIG. 26 is a diagram illustrating a circuit configuration of a compensation sub-pixel according to a fourth embodiment of the present disclosure.
Figure 27:
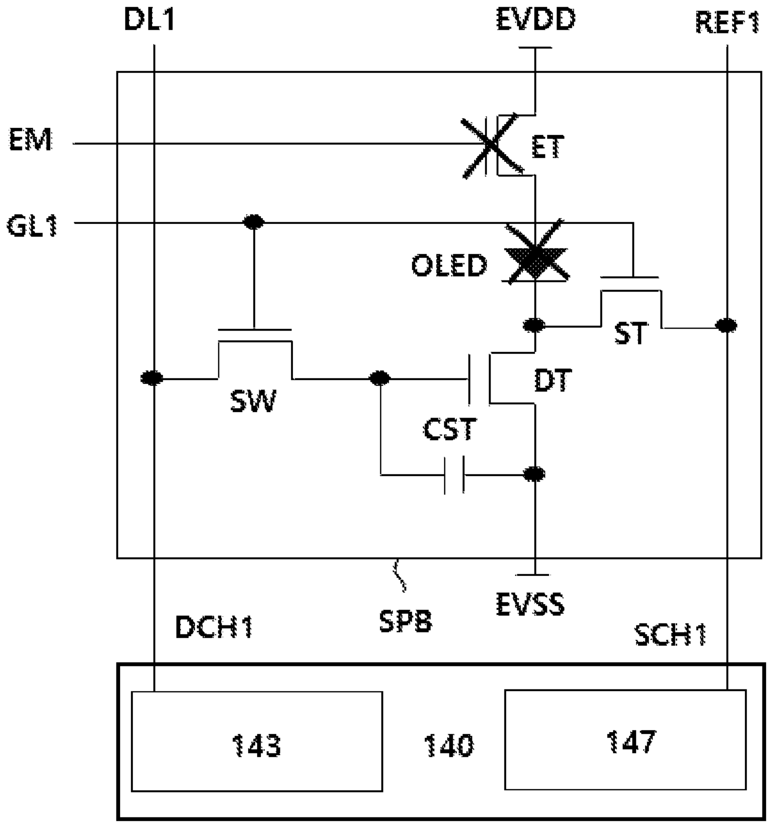
FIGS. 27 and 28 are diagrams schematically illustrating a first sensing method according to the fourth embodiment of the present disclosure.
Figure 28:
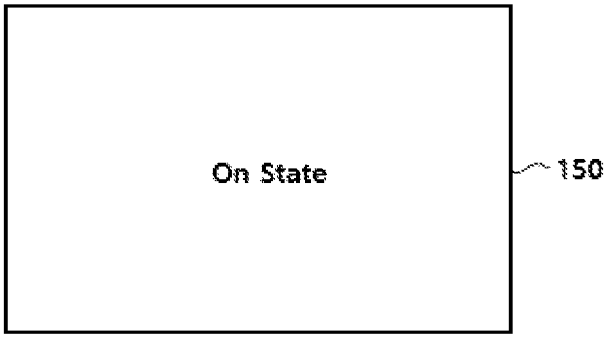

FIG. 26 is a diagram illustrating a circuit configuration of a compensation sub-pixel according to a fourth embodiment of the present disclosure, and FIGS. 27 and 28 are diagrams schematically illustrating a first sensing method according to the fourth embodiment of the present disclosure.

As illustrated in FIGS. 26 to 28, the first sensing method according to the fourth embodiment of the present disclosure can be performed in an on state in which the screen of the display panel 150 is turned on. The first sensing method according to the fourth embodiment of the present disclosure can drive the compensation sub-pixel SPB under conditions similar to those of the second embodiment.

According to the first sensing method according to the fourth embodiment of the present disclosure, the first driving voltage Evdd corresponding to the high voltage applied to the first driving voltage line EVDD may be maintained without being changed to a low voltage. That is, a process of controlling output of the power supply can be omitted.

To this end, the compensation sub-pixel SPB may include a control transistor ET having a gate electrode connected to the control signal line EM, a first electrode connected to the first driving voltage line EVDD, and a second electrode connected to the anode of the organic light emitting diode OLED. Further, in order to perform the first sensing method, the control transistor ET can be turned off.

Figure 29:
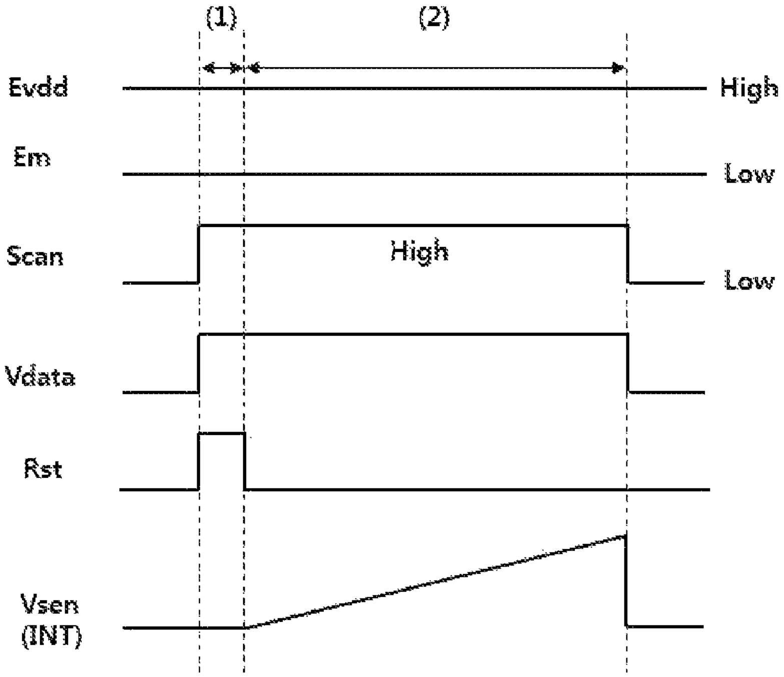
FIGS. 29, 30, and 31 are diagrams for describing the first sensing method according to the fourth embodiment of the present disclosure in more detail.
Figure 30:
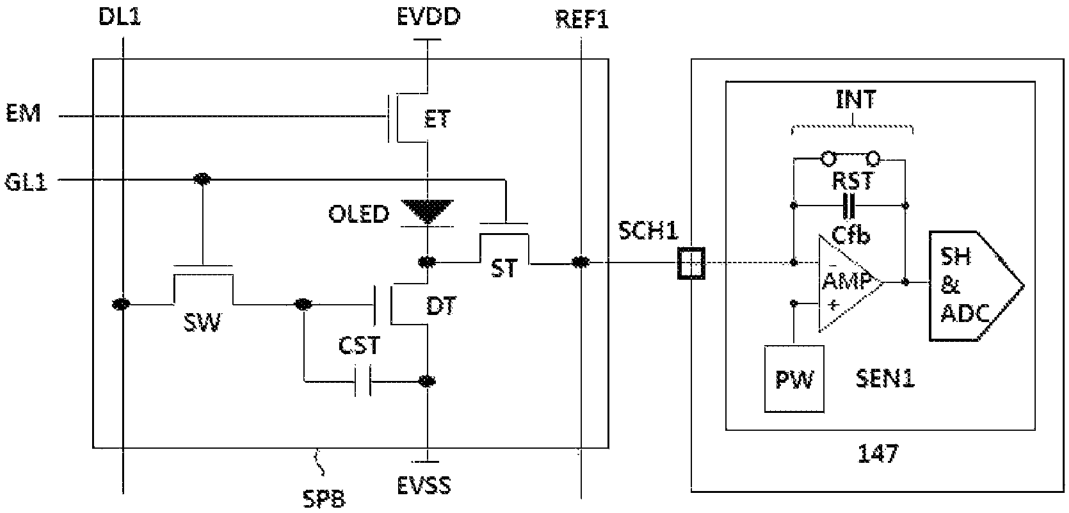
Figure 31:
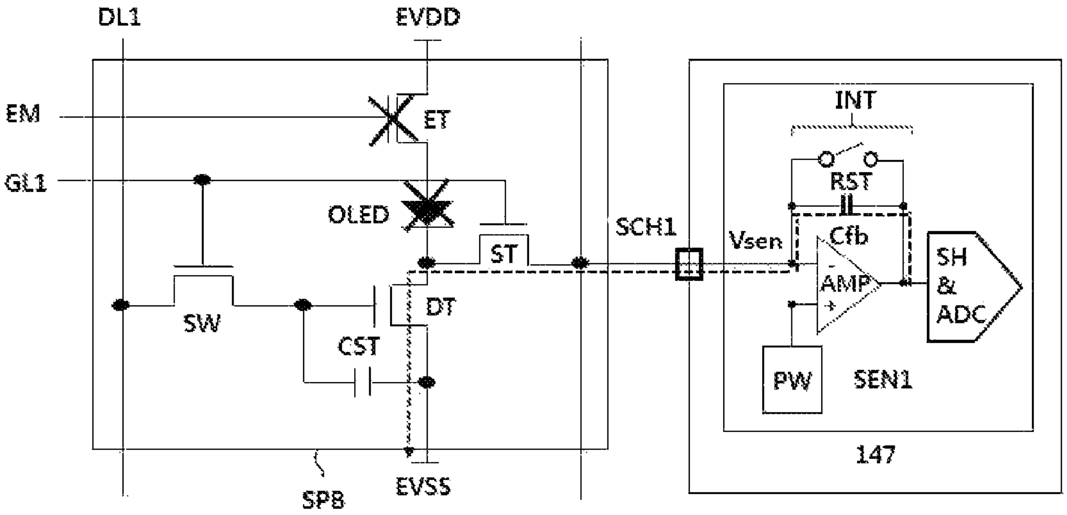

FIGS. 29 to 31 are diagrams for describing the first sensing method according to the fourth embodiment of the present disclosure in more detail.

As illustrated in FIGS. 29 to 31, in order to perform the first sensing method according to the fourth embodiment of the present disclosure, the pixel sensing circuit 147 may sense the compensation sub-pixel SPB, integrate sensed values, and output a sensed value Vsen using the first sensing circuit SEN1 including an integrator INT and the like.

The first sensing circuit SEN1 may include the integrator INT having a reset switch RST, a feedback capacitor Cfb, and an amplifier AMP, and an analog-to-digital conversion circuit ADC that converts the analog sensed value Vsen output from the integrator INT into a digital sensed value and outputs the digital sensed value. The power PW applied to the non-inverting terminal (+) of the integrator INT may be set to a level higher than the gate-source voltage of the driving transistor DT (to enable transistors included in the sub-pixel to be driven in the saturation mode).

In order to perform the first sensing method according to the fourth embodiment, the first driving voltage Evdd corresponding to a high voltage may be applied to the first driving voltage line EVDD during the first period (1) and the second period (2). In addition, an emission control signal Em at a low voltage may be applied to the control signal line EM during the first period (1) and the second period (2). A scan signal Scan at a high voltage may be applied to the first gate line GL1 during the first period (1) and the second period (2). Further, the sensing data voltage Vdata may be applied to the first data line DL1 during the first period (1) and the second period (2). The reset signal Rst at a high voltage may be applied to the reset switch RST during the first period (1), and the reset signal Rst at a low voltage may be applied to the reset switch RST during the second period (2).

The first period (1) may be defined as an initialization period in which the gate-source voltage of the driving transistor DT and the output terminal of the integrator INT are initialized. As illustrated in FIG. 30, the reset switch RST included in the first sensing circuit SEN1 may be turned on during the first period (1) corresponding to the initialization period. Accordingly, the gate-source voltage of the driving transistor DT and the output terminal of the integrator INT can be initialized based on the power PW.

The second period (2) may be defined as a sensing period in which current generated through a current path between the integrator INT and the second driving voltage line EVSS is sensed. As illustrated in FIG. 31, current may flow through a path from the integrator INT to the second driving voltage line EVSS during the second period (2) corresponding to the sensing period. Accordingly, the sensed value Vsen corresponding to the current flowing through the path can be integrated in the feedback capacitor Cfb.

When the compensation sub-pixel SPB is driven in the above manner, the switching transistor SW, driving transistor DT, and sensing transistor ST are turned on, but the organic light emitting diode OLED may be turned off by the turned-off control transistor ET (non-emitting state). In this case, as in the first sensing method according to the second embodiment, a path through which current can flow to the second driving voltage line EVSS may be formed in the driving transistor DT.

The pixel sensing circuit 147 may convert the sensed value Vsen obtained through the compensation sub-pixel SPB into a digital value and transmit the converted digital value to the timing controller (or compensation circuit). The timing controller may determine whether or not the characteristics (threshold voltage or mobility) of the driving transistor DT included in the compensation sub-pixel SPB have changed based on the sensed value converted into a digital value and provide a compensation value for compensating for normal sub-pixels in real time depending on the degree of change in the characteristics.

As described above, according to the first sensing method according to the fourth embodiment of the present disclosure, it is possible to sense whether or not the characteristics of the driving transistor DT included in the compensation sub-pixel SPB have changed in real time in an on state in which the screen of the display panel 150 is turned on. In addition, it is possible to provide a compensation value for compensating for normal sub-pixels (including the compensation sub-pixels) in real time based on whether or not the characteristics of the driving transistor DT included in the compensation sub-pixel SPB have changed. In this case, the compensation value may be used as a value capable of compensating for the gain of a data signal or the level of a data voltage.

Figure 32:
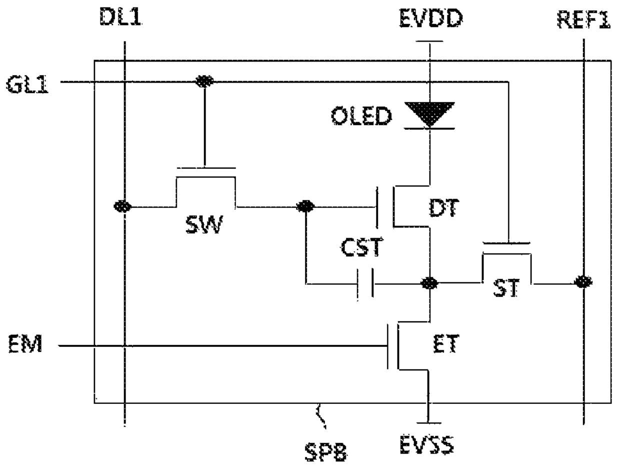
FIG. 32 is a diagram illustrating a circuit configuration of a compensation sub-pixel according to a fifth embodiment of the present disclosure.
Figure 33:
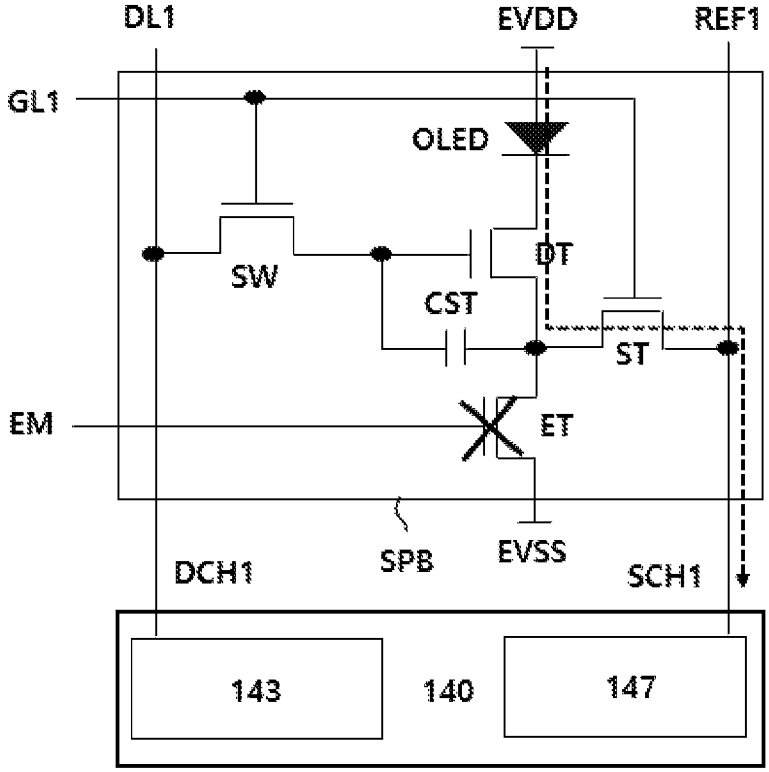
FIGS. 33 and 34 are diagrams schematically illustrating a second sensing method according to a fifth embodiment of the present disclosure.
Figure 34:
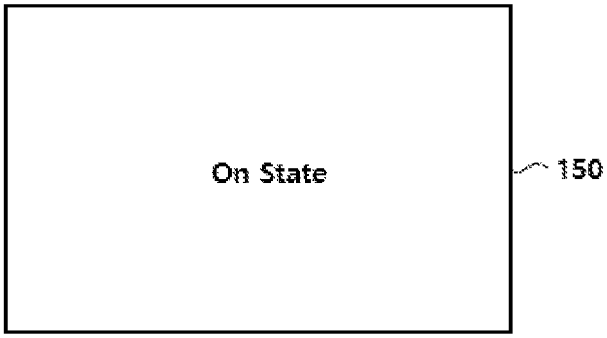

FIG. 32 is a diagram illustrating a circuit configuration of a compensation sub-pixel according to a fifth embodiment of the present disclosure, and FIGS. 33 and 34 are diagrams schematically illustrating a second sensing method according to the fifth embodiment of the present disclosure.

As illustrated in FIGS. 32 to 34, the second sensing method according to the fifth embodiment of the present disclosure can be performed in an on state in which the screen of the display panel 150 is turned on. In the second sensing method according to the fifth embodiment of the present disclosure, the control transistor ET is provided, but the connection relationship of the control transistor ET and the connection relationship of the sensing transistor ST are different from those in the foregoing embodiments.

To this end, the compensation sub-pixel SPB may include a switching transistor SW, an organic light emitting diode OLED, a driving transistor DT, a capacitor CST, a sensing transistor ST, and a control transistor ET, similarly to the fourth embodiment. However, the present embodiment differs from the fourth embodiment in that the sensing transistor ST has a gate electrode connected to the first gate line GL1, a first electrode connected to the first sensing line REF1, and a second electrode connected to a second electrode of the driving transistor DT, which is a sensing node, and a first electrode of the control transistor ET. In addition, the present embodiment differs from the fourth embodiment in that the control transistor ET has a gate electrode connected to the control signal line EM, the first electrode connected to the second electrode of the driving transistor DT, and a second electrode connected to the second driving voltage line EVSS.

To perform the second sensing method, the control transistor ET may be turned off. Accordingly, the source node of the driving transistor DT may be floated. In this case, since the output of the first driving voltage supplied through the first driving voltage line EVDD can be maintained as it is, the process of controlling output of the power supply can be omitted.

Figure 35:
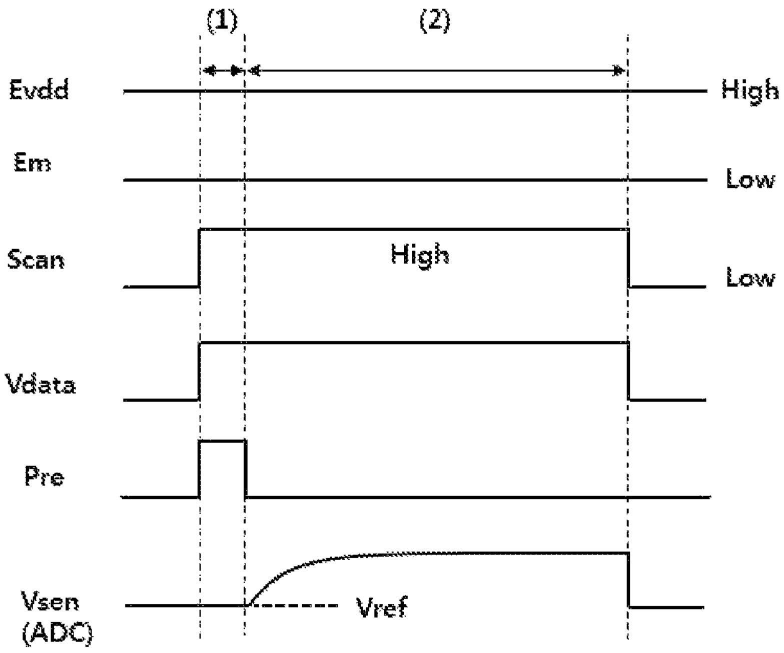
FIGS. 35, 36, and 37 are diagrams for describing the second sensing method according to the fifth embodiment of the present disclosure.
Figure 36:
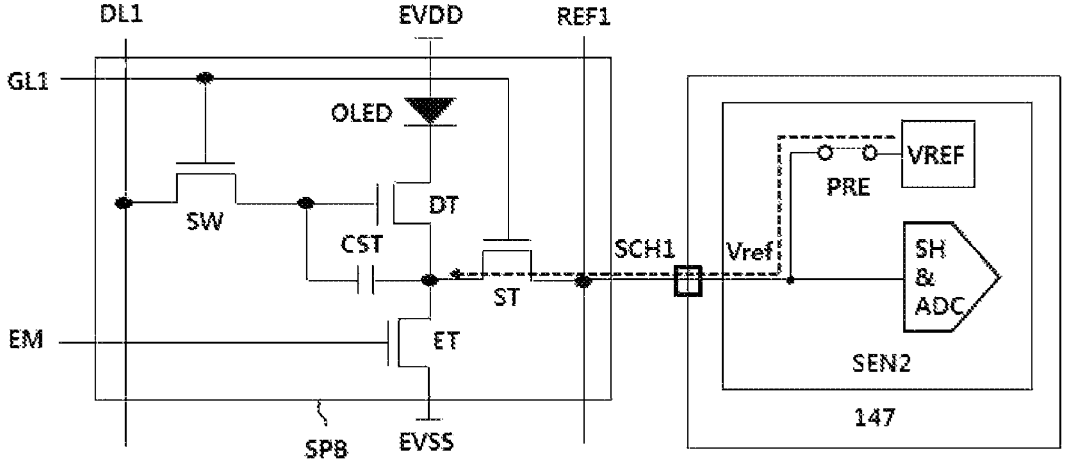
Figure 37:
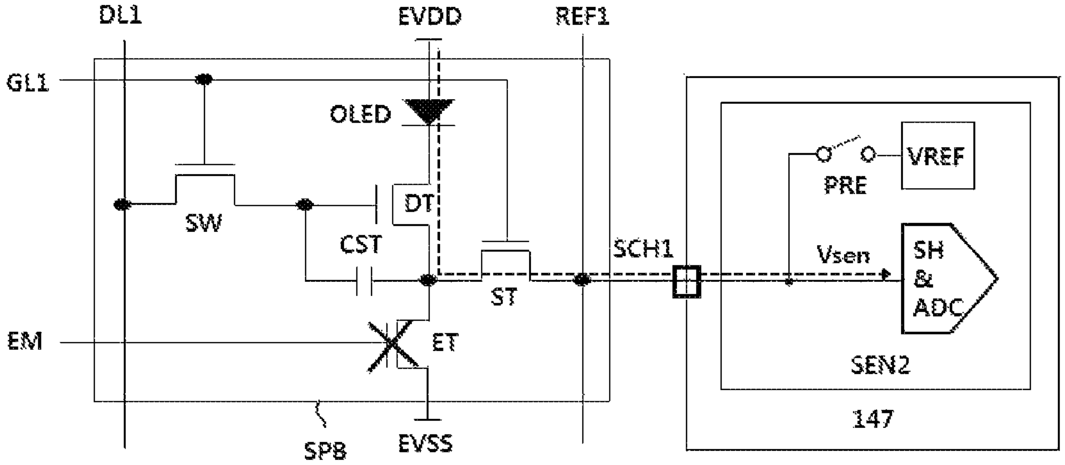

FIGS. 35 to 37 are diagrams for describing the second sensing method according to the fifth embodiment of the present disclosure in more detail.

As illustrated in FIGS. 35 to 37, in order to perform the second sensing method according to the fifth embodiment of the present disclosure, the pixel sensing circuit 147 may sense the compensation sub-pixel SPB and output a sensed value Vsen using the second sensing circuit SEN2 including a sample & hold SH and analog-to-digital conversion circuit SH & ADC.

The second sensing circuit SEN2 may include a precharge switch PRE, a sensing reference voltage source VREF, and a sample & hold SH and analog-to-digital conversion circuit SH & ADC. The sensing reference voltage source VREF may output a sensing reference voltage Vref at one fixed level or a variable level.

In order to perform the second sensing method according to the fifth embodiment, the first driving voltage Evdd corresponding to a high voltage may be applied to the first driving voltage line EVDD during the first period (1) and the second period (2). In addition, the emission control signal Em at a low voltage may be applied to the control signal line EM during the first period (1) and the second period (2). A scan signal Scan at a high voltage may be applied to the first gate line GL1 during the first period (1) and the second period (2). Further, a sensing data voltage Vdata may be applied to the first data line DL1 during the first period (1) and the second period (2). In addition, a precharge signal Pre at a high voltage may be applied to the precharge switch PRE during the first period (1), and the precharge signal Pre at a low voltage may be applied thereto during the second period (2).

The first period (1) may be defined as an initialization and precharge period in which the source node of the driving transistor DT and the first sensing line REF1 are initialized and precharged. As illustrated in FIG. 36, the precharge switch PRE included in the second sensing circuit SEN2 may be turned on during the first period (1) corresponding to the initialization and precharge period. Accordingly, the source node of the driving transistor DT and the first sensing line REF1 can be initialized and precharged based on the sensing reference voltage Vref output from the sensing reference voltage source VREF.

The second period (2) may be defined as a sensing period in which a voltage generated from the driving transistor DT is sensed in a source following manner. As illustrated in FIG. 37, during the second period (2) corresponding to the sensing period, voltage may be applied to a path from the first driving voltage line EVDD to the sample & hold and analog-to-digital conversion circuit SH & ADC. Accordingly, the sensed value Vsen corresponding to the voltage applied to the path can be charged in the sample & hold circuit SH.

When the compensation sub-pixel SPB is driven in the above manner, the switching transistor SW, driving transistor DT, and sensing transistor ST are turned on, but the organic light emitting diode OLED may be turned off by the turned-off control transistor ET (non-emitting state). Further, as the second electrode (sensing node) of the driving transistor DT is floated by the turned-off control transistor ET, voltage rise may occur by the sensing reference voltage. The voltage rise may occur to reach a difference between the sensing data voltage Vdata and the threshold voltage of the driving transistor DT. As such, voltage rise at the source electrode of the driving transistor DT is referred to as source following.

The pixel sensing circuit 147 may convert the sensed value Vsen obtained through the compensation sub-pixel SPB into a digital value and transmit the converted digital value to the timing controller (or compensation circuit). The timing controller may determine whether or not the characteristics (threshold voltage or mobility) of the driving transistor DT included in the compensation sub-pixel SPB have changed based on the sensed value converted into a digital value and provide a compensation value for compensating for normal sub-pixels in real time depending on the degree of change in the characteristics.

According to the second sensing method according to the fifth embodiment of the present disclosure, it is possible to sense whether or not the characteristics of the driving transistor DT included in the compensation sub-pixel SPB have changed in real time in the on state in which the screen of the display panel 150 is turned on. In addition, it is possible to provide a compensation value for compensating for normal sub-pixels (including the compensation sub-pixels) in real time based on whether or not the characteristics of the driving transistor DT included in the compensation sub-pixel SPB have changed. In this case, the compensation value may be used as a value capable of compensating for the gain of a data signal or the level of a data voltage.

Figure 38:
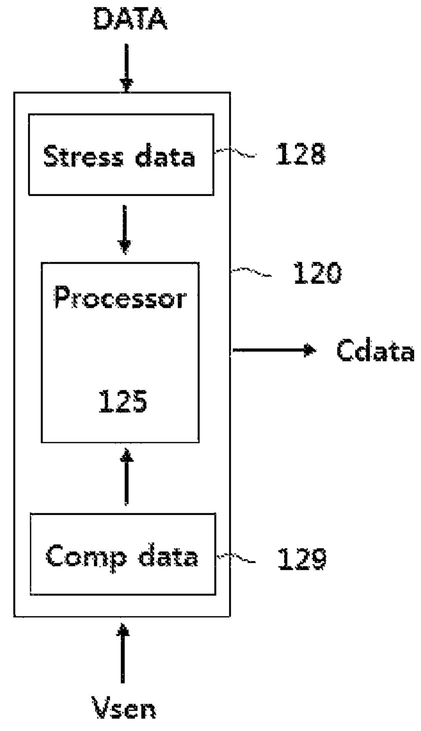
FIG. 38 is a diagram illustrating the configuration of a timing controller according to a sixth embodiment of the present disclosure.

FIG. 38 is a configuration diagram of a timing controller according to a sixth embodiment of the present disclosure.

As illustrated in FIG. 38, the timing controller 120 according to the sixth embodiment of the present disclosure may include a stress data generator 128 (e.g., a circuit), a data processor 125 (e.g., a circuit), and a compensation data generator 129 (e.g., a circuit).

The stress data generator 128 may generate stress data for estimating changes in driving characteristics and deterioration of elements such as the organic light emitting diode OLED and the driving transistor DT based on a data signal DATA input from the outside.

The compensation data generator 129 may determine whether driving characteristics of elements such as the organic light emitting diode OLED and the driving transistor DT have changed and deterioration thereof based on a sensed value Vsen transmitted from the data driver and generate compensation data for compensating for the same.

The data processor 125 may generate a compensation data signal Cdata by compensating for the data signal DATA according to a selected one of the stress data generator 128 and the compensation data generator 129 and then output the compensation data signal Cdata. For example, the data processor 125 may provide the compensation data signal Cdata by compensating for the data signal DATA based on the stress data generator 128 during a first driving period, which is an initial driving period of the display panel. Further, the data processor 125 may provide the compensation data signal Cdata by compensating for the data signal DATA based on the compensation data generator 129 during a second driving period, which is a middle/later driving period of the display panel. If the compensation operation is performed in this way, compensation precision can be increased during the middle/later driving period in which deterioration may be aggravated, and thus display quality can be improved compared to a method using only one compensation method and lifespan can also be improved.

Meanwhile, some compensation sub-pixels have been illustrated and described in the present disclosure. However, the compensation sub-pixel according to the present disclosure may be modified into a form in which signal lines, transistors, capacitors, and the like are further included.

The present disclosure has an effect of compensating for deterioration of driving transistors and organic light emitting diodes included in a display panel based on heterogeneous sub-pixels including a normal sub-pixel and a compensation sub pixel. In addition, the present disclosure has an effect of sensing a compensation sub-pixel in various manners and at various times and improving compensation performance for the entire display panel by considering driving environment variables such as current change, voltage change, and temperature change based on the sensed compensation sub-pixel. Furthermore, the present disclosure has an effect of reducing aperture ratio reduction and luminance reduction perception problems when implementing heterogeneous sub-pixels including a normal sub-pixel and a compensation sub-pixel.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A light emitting display device comprising:

a display panel configured to display an image, the display panel including a data line and a sensing line;

a data driver configured to drive the display panel; and a timing controller configured to control the data driver, wherein the display panel includes a first sub-pixel and a second sub-pixel, wherein each of the first sub-pixel and the second sub-pixel is connected to the data line, and wherein a sensing transistor that is configured to be turned on during a sensing operation through the sensing line is connected to the second sub-pixel and not connected to the first sub-pixel.

2. The light emitting display device of claim 1, wherein the display panel includes a display area in which the image is displayed and a non-display area in which the image is not displayed, and the second sub-pixel is in the non-display area or in the display area.

3. The light emitting display device of claim 1, wherein a size of an aperture area of the first sub-pixel is a same as a size of an aperture area of the second sub-pixel.

4. The light emitting display device of claim 1, wherein the second sub-pixel is connected to a same data line as the first sub-pixel.

5. The light emitting display device of claim 1, wherein the data driver includes a voltage output circuit configured to output a data voltage through the data line and a pixel sensing circuit configured to obtain a sensed value through the sensing line, and the pixel sensing circuit senses the second sub-pixel through a first sensing method or senses the second sub-pixel through a second sensing method that is different from the first sensing method.

6. The light emitting display device of claim 5, further comprising:

a compensation circuit configured to receive the sensed value from the pixel sensing circuit and compensate the display panel and devices required to drive the display panel based on the sensed value.

7. The light emitting display device of claim 6, wherein the compensation circuit is configured to generate a compensation data signal based on the sensed value, the compensation data signal compensating for deterioration of at least one of a driving transistor and an organic light emitting diode included in the first sub-pixel.

8. The light emitting display device of claim 6, wherein the sensed value is indicative of driving environmental variables including current change, voltage change, and temperature change in the display panel and the compensation circuit is configured to generate a compensation data signal based on the sensed value that compensates for the driving environmental variables.

9. The light emitting display device of claim 8, wherein the second sub-pixel is included in a plurality of second sub-pixels that are distributed in the display panel at a plurality of positions in the display panel, and the compensation circuit obtains the current change, voltage change, and temperature change for each of the plurality of positions based on the plurality of second sub-pixels distributed in the display panel.

10. The light emitting display device of claim 6, wherein the compensation circuit further includes:

a deterioration prediction compensator configured to compensate the first sub-pixel in a non-sensing manner such that the first sub-pixel is not sensed by updating a deterioration prediction model of the first sub-pixel based on a compensation value that is generated based on the sensed value.

11. A method of driving a light emitting display device including a display panel including a data line, a sensing line, a first sub-pixel, and a second sub-pixel, wherein each of the first sub-pixel and the second sub-pixel is connected to the data line, and wherein a sensing transistor that is configured to be turned on during a sensing operation through the sensing line is connected to the second sub-pixel and not connected to the first sub-pixel, the method comprising:

obtaining a sensed value of the second sub-pixel through the sensing line connected to the second sub-pixel; and compensating at least one of the first sub-pixel included in the display panel and a device that is required to drive the display panel based on the sensed value of the second sub-pixel.

12. The method of claim 11, wherein the sensed value is obtained through one of a current sensing method or a voltage sensing method, and at least one of a driving transistor or an organic light emitting diode included in the first sub-pixel is compensated based on the sensed value.

13. A light emitting display device comprising:

a display panel configured to display an image, the display panel including a data line, a sensing line, a first sub-pixel, and a second sub-pixel;

a data driver configured to drive the display panel; and a timing controller configured to generate a compensation value corresponding to the first sub-pixel based on a sensed value of the second sub-pixel sensed through the sensing line, wherein each of the first sub-pixel and the second sub-pixel is connected to the data line, wherein a sensing transistor that is configured to be turned on during a sensing operation through the sensing line is connected to the second sub-pixel and not connected to the first sub-pixel, and wherein the data driver outputs a data voltage that is compensated with the compensation value to the first sub-pixel via the data line.

14. The light emitting display device of claim 13, wherein the display panel includes a display area in which the image is displayed and a non-display area in which the image is not displayed, and the second sub-pixel is in the non-display area or in the display area.

15. The light emitting display device of claim 13, wherein a size of an aperture area of the first sub-pixel is a same as a size of an aperture area of the second sub-pixel.

16. The light emitting display device of claim 13, wherein the first sub-pixel comprises:

a first driving transistor including a gate electrode, a first electrode, and a second electrode;

a first light emitting element connected to the first electrode of the first driving transistor;

a first switching transistor including a first electrode connected to the data line, a second electrode connected to the gate electrode of the first driving transistor, and a gate electrode connected to a first gate line; and a first capacitor including a first electrode that is connected to the second electrode of the first switching transistor and the gate electrode of the first driving transistor and a second electrode that is connected to a driving voltage line.

17. The light emitting display device of claim 16, wherein the second sub-pixel comprises:

a second driving transistor including a gate electrode, a first electrode, and a second electrode;

a second light emitting element connected to the first electrode of the second driving transistor;

a sensing transistor including a first electrode connected to the first electrode of the second driving transistor and the second light emitting element, a second electrode connected to the sensing line, and a gate electrode connected to the first gate line;

a second switching transistor including a first electrode connected to the data line, a second electrode connected to the gate electrode of the second driving transistor, and a gate electrode connected to the first gate line and the gate electrode of the sensing transistor; and a second capacitor including a first electrode that is connected to the second electrode of the second switching transistor and the gate electrode of the second driving transistor and a second electrode that is connected to the driving voltage line.

18. The light emitting display device of claim 13, wherein the data driver comprises:

a voltage output circuit configured to output the data voltage to the first sub-pixel through the data line; and a pixel sensing circuit configured to obtain the sensed value from the second sub-pixel through the sensing line.

19. The light emitting display device of claim 18, wherein the timing controller comprises:

a compensation circuit configured to receive the sensed value from the pixel sensing circuit and generate the compensation value.

20. The light emitting display device of claim 18, wherein the pixel sensing circuit comprises:

a selection circuit connected to the sensing line;

a first sensing circuit configured to sense the second sub-pixel using a current sensing method; and a second sensing circuit configured to sense the second sub-pixel using a voltage sensing method, wherein the selection circuit is configured to switch between being connected to the first sensing circuit and being connected to the second sensing circuit according to a control signal.

* * * * *